(12) United States Patent
Drexler et al.

(10) Patent No.: US 11,027,517 B2
(45) Date of Patent: Jun. 8, 2021

(54) DECORATIVE LAMINATES INCLUDING THERMOPLASTIC INK LAYERS AND RELATED METHODS

(71) Applicant: The Boeing Company, Chicago, IL (US)

(72) Inventors: Jason W. Drexler, Brier, WA (US); John Christopher Wilde, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/284,188

(22) Filed: Oct. 3, 2016

(65) Prior Publication Data
US 2018/0093445 A1  Apr. 5, 2018

(51) Int. Cl.
*B32B 5/02* (2006.01)
*B32B 7/12* (2006.01)
(Continued)

(52) U.S. Cl.
CPC ............ *B32B 5/024* (2013.01); *B32B 7/12* (2013.01); *B32B 37/06* (2013.01); *B32B 37/10* (2013.01);
(Continued)

(58) Field of Classification Search
CPC ....... B32B 5/024; B32B 21/047; B32B 21/10; B32B 2255/02; B32B 2255/26; B32B 2255/28; B32B 2260/021; B32B 2260/026; B32B 2260/046; B32B 2262/0269; B32B 2262/0276; B32B 2262/062; B32B 2262/065; B32B 2262/067;
(Continued)

(56) References Cited

U.S. PATENT DOCUMENTS

| | | | | |
|---|---|---|---|---|
| 3,660,200 A | * | 5/1972 | Anderson | ............... B32B 27/00 156/278 |
| 3,669,829 A | * | 6/1972 | Caldo | .................... D21H 5/202 162/146 |

(Continued)

FOREIGN PATENT DOCUMENTS

| | | |
|---|---|---|
| CN | 1842414 | 10/2006 |
| CN | 101394994 | 3/2009 |
| WO | 2016016864 | 2/2016 |

OTHER PUBLICATIONS

United States Patent and Trademark Office, "Fire-Resistant, Gas Permeable Decorative Laminate", U.S. Appl. No. 14/633,276, filed Feb. 27, 2015 (32 pages).
(Continued)

*Primary Examiner* — James M Mellott
(74) *Attorney, Agent, or Firm* — Hanley, Flight & Zimmerman

(57) ABSTRACT

Decorative laminates including thermoplastic ink layers and related methods are disclosed. An example apparatus includes a reinforcing layer to provide a rigidity to a decorative laminate, thermoplastic ink applied to the reinforcing layer to form a decorative pattern of the decorative laminate, and a film layer coupled to the thermoplastic ink to form the decorative laminate. The film layer is to preserve the decorative pattern. The thermoplastic ink is solidified when the film layer is coupled to the thermoplastic ink.

20 Claims, 7 Drawing Sheets

(51) Int. Cl.
   *B32B 37/06* (2006.01)
   *B32B 37/10* (2006.01)
   *B32B 37/12* (2006.01)
   *B60R 13/00* (2006.01)

(52) U.S. Cl.
   CPC .......... *B32B 37/12* (2013.01); *B32B 2605/00* (2013.01); *B60R 13/00* (2013.01)

(58) Field of Classification Search
   CPC ........ B32B 2262/101; B32B 2262/106; B32B 2307/3065; B32B 2307/41; B32B 2307/412; B32B 2307/414; B32B 2307/546; B32B 2451/00; B32B 2605/00; B32B 2605/18; B32B 27/065; B32B 27/12; B32B 27/304; B32B 37/06; B32B 37/10; B32B 37/12; B32B 3/12; B32B 3/28; B32B 5/022; B32B 5/18; B32B 5/245; B32B 5/26; B32B 5/32; B32B 7/12; B60R 13/00
   See application file for complete search history.

(56) References Cited

U.S. PATENT DOCUMENTS

| | | | | |
|---|---|---|---|---|
| 4,150,186 | A * | 4/1979 | Kazama | B32B 3/28 428/140 |
| 5,136,938 | A * | 8/1992 | Pellegrina | B41F 15/0863 101/115 |
| 5,518,786 | A * | 5/1996 | Johnson | B05D 1/286 428/354 |
| 5,914,176 | A | 6/1999 | Myers | |
| 6,465,091 | B1 * | 10/2002 | Ou-Yang | C09J 7/401 428/352 |
| 2002/0182957 | A1 | 12/2002 | Levenda | |
| 2004/0044119 | A1 * | 3/2004 | Etzrodt | B32B 27/08 524/543 |
| 2005/0070628 | A1 * | 3/2005 | Menoud | C09D 11/102 523/160 |
| 2016/0089851 | A1 | 3/2016 | Drexler et al. | |

OTHER PUBLICATIONS

China National Intellectual Property Administration, "First Notification of Office Action," issued in connection with Chinese Patent Application No. 201710894871.6, dated Nov. 24, 2020, 23 pages. English version included.

* cited by examiner

DECORATIVE LAMINATES INCLUDING THERMOPLASTIC INK LAYERS AND RELATED METHODS

FIELD OF THE DISCLOSURE

This patent relates generally to decorative laminates and, more particularly, to decorative laminates including thermoplastic ink layers and related methods.

BACKGROUND

Vehicles (e.g., mass transit vehicles, tractor-trailers, personal automobiles, etc.), buildings and/or other structures (e.g., billboards) include surfaces that are visible to the people in the vehicles. Oftentimes, these surfaces include decorative images for aesthetic, informational and/or advertising purposes. For example, some interior surfaces of aircraft and/or other mass transit vehicles (e.g., buses, trains, ships, etc.) include decorative images that identify the mass transit provider (e.g., an airline carrier) and/or advertise for another entity. In some instances, the decorative images are formed by a decorative laminate that is coupled to a surface of the vehicle, building and/or other structure.

SUMMARY

In one example, an apparatus includes a reinforcing layer to provide a rigidity to a decorative laminate, thermoplastic ink applied to the reinforcing layer to form a decorative pattern of the decorative laminate, and a film layer coupled to the thermoplastic ink to form the decorative laminate. The film layer is to preserve the decorative pattern. The thermoplastic ink is solidified when the film layer is coupled to the thermoplastic ink.

In another example, a method includes applying thermoplastic ink to a reinforcing layer. The reinforcing layer is to provide a rigidity to a decorative laminate. The thermoplastic ink is to form a decorative pattern of the decorative laminate. The method includes solidifying the thermoplastic ink applied to the reinforcing layer and coupling a film layer to the thermoplastic ink to form the decorative laminate. The film layer is to preserve the decorative pattern of the decorative laminate.

In another example, an apparatus includes means for providing a rigidity to a decorative laminate and means for forming a decorative pattern applied to the means for providing a rigidity to form a decorative pattern of the decorative laminate. The means for forming a decorative pattern is to be solidified upon being applied to the means for providing a rigidity. The means for preserving a decorative pattern is coupled to the means for forming a decorative pattern to preserve the decorative pattern.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
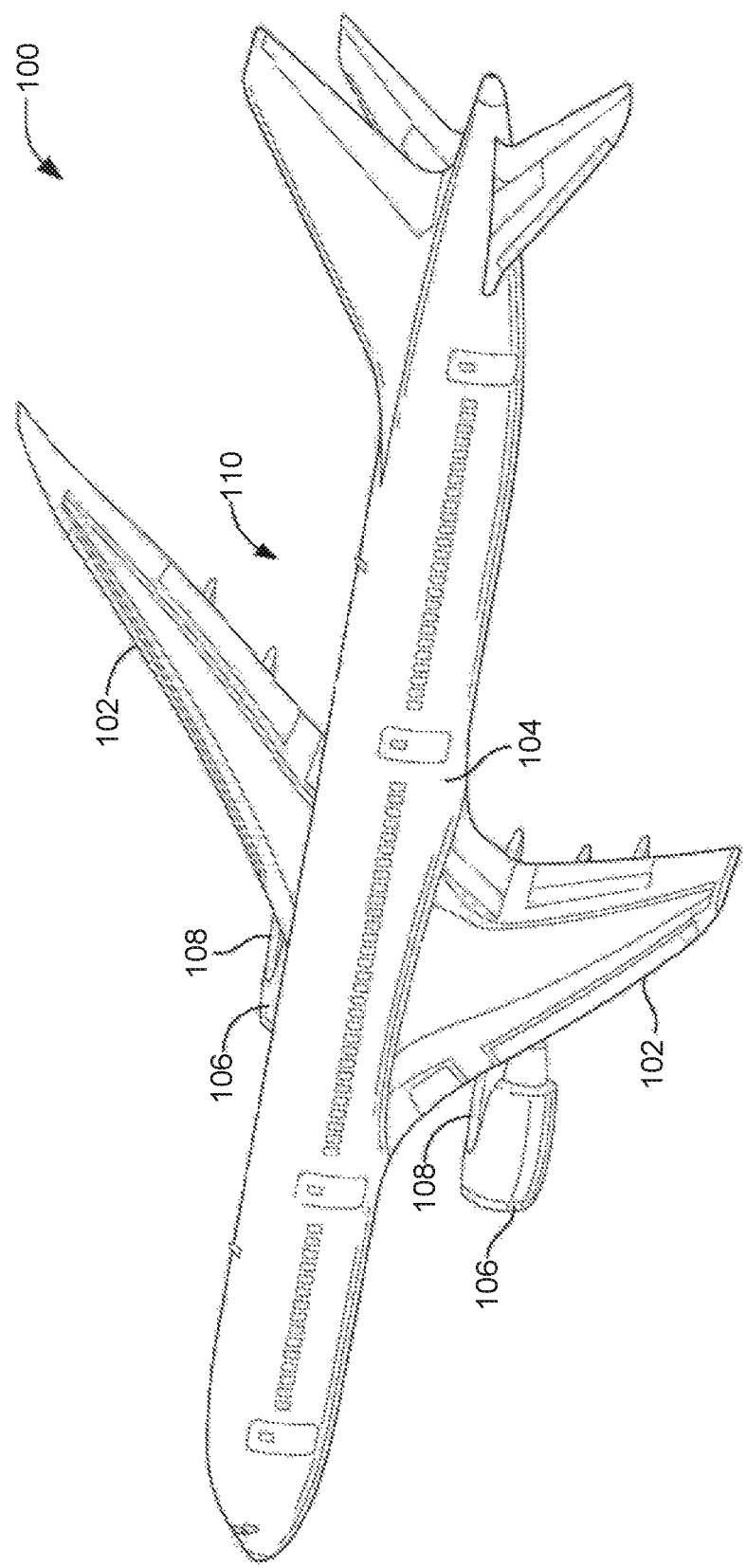
FIG. 1 depicts an example aircraft in accordance with the teachings herein.

Surfaces in public spaces (e.g., billboards, building walls, vehicle panels, etc.) oftentimes include decorative images for aesthetic, informational, and/or advertising purposes. Some known aircraft and/or other mass transit vehicles (e.g., buses, trains, ships, etc.) often include decorative images (e.g., a decorative pattern, words, a logo, etc.) on their surfaces for aesthetic, informational and/or advertising purposes. For example, interior surfaces of mass transit vehicles include decorative images that identify the mass transit provider (e.g., an airline carrier) and/or advertise for another entity. In some examples, the decorative images are formed by a decorative laminate that is coupled to the interior surface of the vehicle.

Many known decorative laminates include a plurality of layers. For example, some known decorative laminates include a first film layer, an embossing resin layer, a second film layer, one or more ink layers, and a clear cap layer. In such examples, the embossing resin layer is disposed between the first and second film layers, and the ink layers are disposed between the second film layer and the clear cap layer. The first film layer provides a rigidity and/or strength to the decorative laminate, and the embossing resin layer bonds the layers of the decorative laminate together and enables a texture to be formed in the decorative laminate. The second film layer may be composed of an opaque material that acts as a primer and/or base layer for the decorative image of the decorative laminate. Further, the one or more ink layers are applied to the second film layer to form the decorative image. In such examples, the ink layers are composed of water-based ink that is applied to the second film layer via screen printing and is set in place by applying heat to evaporate the water of the water-based ink. Further, the cap layer is clear to enable viewing of the decorative images formed by the ink layers and the second film layer.

While such known decorative laminates enable a decorative image to be displayed on a surface of a structure (e.g., on an interior panel of an aircraft), the number, thicknesses and/or materials of the layers utilized to form the decorative laminate may add a significant amount of weight to a structure (e.g., an aircraft) on which it is installed. Further, such known decorative laminates may require a significant amount of time to be manufactured. For example, the amount of time to produce and/or assemble the plurality of layers (e.g., a plurality of film layers, an embossing resin layer, a plurality of ink layers, a clear cap layer) of the decorative laminates may be significant. Additionally or alternatively, it may take a significant amount of time to solidify (e.g., cure) the embossing resin that bonds the layers together and/or to dry the water-based ink via heat. Further, production of such known decorative laminates may result in a significant amount of waste. For example, some of the materials (e.g., embossing resin) utilized to form the decorative laminates may be unrecyclable, which prevents formed and/or partially formed decorative laminates from being recycled and, thus, produces waste. Additionally, known decorative laminates are formed utilizing precut segments of the layers. A significant amount of scrap material may result when cutting and/or forming the segments of the layers to be assembled, thereby resulting in waste associated with formation of the decorative laminates.

The example decorative laminates disclosed herein utilize thermoplastic ink (e.g., plastisol) that forms decorative images and/or patterns of the decorative laminates and solidifies to bond to an adjacent layer (e.g., a reinforcing layer) of the decorative laminates. That is, the thermoplastic ink of the examples disclosed herein forms the decorative pattern of the decorative laminate and bonds to the adjacent reinforcing layer. Thus, the layers of the example decorative laminates are assembled without use of a specialized embossing resin, thereby reducing a number of layers utilized to form the decorative laminates. By reducing the number of materials and/or layers utilized to form a decorative laminate, the examples disclosed herein reduce a weight of the decorative laminate.

Further, the examples disclosed herein substantially reduce manufacturing time and/or costs associated with assembling decorative laminates. For example, reducing the number of layers utilized to form the example decorative laminates reduces manufacturing time and/or costs. Additionally or alternatively, because the example decorative laminates do not utilize embossing resin to assemble the decorative laminates, manufacturing time and/or costs associated with curing the embossing resin is eliminated. In some examples, the decorative laminates disclosed herein are formed utilizing unsegmented rolls of material, thereby further reducing waste, manufacturing costs, and/or manufacturing time associated with segmenting and arranging segmented layers of the decorative laminates.

The example decorative laminates disclosed herein include a reinforcing layer that provides a rigidity to the decorative laminate and a thermoplastic ink that is applied to the reinforcing layers to form a decorative pattern of the decorative laminate. The thermoplastic ink may partially and/or completely cover the reinforcing layer. Further, the example decorative laminates include a film layer that is coupled to the thermoplastic ink to form the decorative laminate. The thermoplastic ink is partially or fully solidified when the film layer is coupled to the thermoplastic ink to prevent and/or deter the film layer from damaging and/or distorting the decorative pattern formed by the thermoplastic ink. In some examples, the decorative laminate has a textured surface. For example, the thermoplastic ink is textured to form the textured surface of the decorative laminate.

In some examples, the thermoplastic ink is composed of plastisol and the reinforcing layer is composed of woven fabric (e.g., polyester, fiberglass, Nomex®, Kevlar®, carbon fiber, etc.). For example, the woven fabric has a textured surface that increases, improves, enhances and/or otherwise enables bonding between the plastisol of the thermoplastic ink and the woven fabric of the reinforcing layer. Additionally or alternatively, the film layer may be composed of a clear thermoplastic film and an adhesive layer and/or a clear thermoplastic ink layer that is solidified.

In some examples, the thermoplastic ink includes a plurality of thermoplastic ink layers (e.g., a first thermoplastic ink layer, a second thermoplastic ink layer, etc.). For example, a first thermoplastic ink layer is applied to the reinforcing layer, a second thermoplastic ink layer is applied to the first thermoplastic ink layer, and the film layer couples to the second thermoplastic ink layer. In such examples, the decorative pattern is formed by a combination of decorative patterns of the respective thermoplastic ink layers. For example, the first thermoplastic ink layer may have a first pattern that covers the reinforcing layer and the second thermoplastic ink layer may have a second pattern that partially covers the first pattern to form the decorative pattern of the decorative laminate.

To form the example decorative laminates disclosed herein, the thermoplastic ink is applied to the reinforcing layer, the thermoplastic ink is solidified (e.g., cured) on the reinforcing layer, and the film layer is coupled to the solidified thermoplastic ink. To solidify (e.g., partially solidify) the thermoplastic ink, the thermoplastic ink is heated to at a temperature of at least about 150 degrees Fahrenheit. Further, to form the textured surface of the decorative laminate, a texture medium contacts the film layer, pressure is applied to the decorative laminate via the texture medium to form a texture in the decorative laminate, and the decorative laminate is heated to a temperature of at least about 300 degrees Fahrenheit to form the decorative laminate and/or set the texture in the decorative laminate.

In some examples, the decorative laminate is formed from a roll of the reinforcing layer. For example, the roll is unwound to enable the thermoplastic ink to be applied to the reinforcing layer and the film layer to be coupled to the thermoplastic ink, and the roll is subsequently rewound upon forming the decorative laminate. In examples in which the thermoplastic ink includes the first and second thermoplastic ink layers, the first thermoplastic ink layer is applied to the reinforcing layer upon the roll being unwound, the first thermoplastic ink layer is solidified, and the roll is rewound. Subsequently, the roll is again unwound, the second thermoplastic ink layer is applied to the first thermoplastic ink layer, the second thermoplastic ink layer is solidified, and the roll is again rewound. Additionally or alternatively, the roll may be unwound and subsequently rewound to enable the film layer to be coupled to the thermoplastic ink and/or to enable the textured surface to be formed in the decorative laminate.

As used herein, the terms "couple," "coupled," and "coupling" refer to a direct or indirect attachment of one object to another object (e.g., one layer to another layer). For example, a first object is directly attached and, thus, coupled to a second object if a surface of the first object contacts a surface of the second object without any other object disposed therebetween. A first object is indirectly attached and, thus, coupled to a second object if the first object does not directly contact the second object but, instead, is fixed to the second object via intermediate object(s) (e.g., layer(s)) that are positioned between the first and second objects. Further, as used herein, the terms "apply," "applied," and "application of" also refer to a direct or indirect attachment of one object to another object (e.g., one layer to another layer).

Turning to the figures, FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. A passenger compartment 110 is disposed within the fuselage 104 of the illustrated example.

Figure 2:
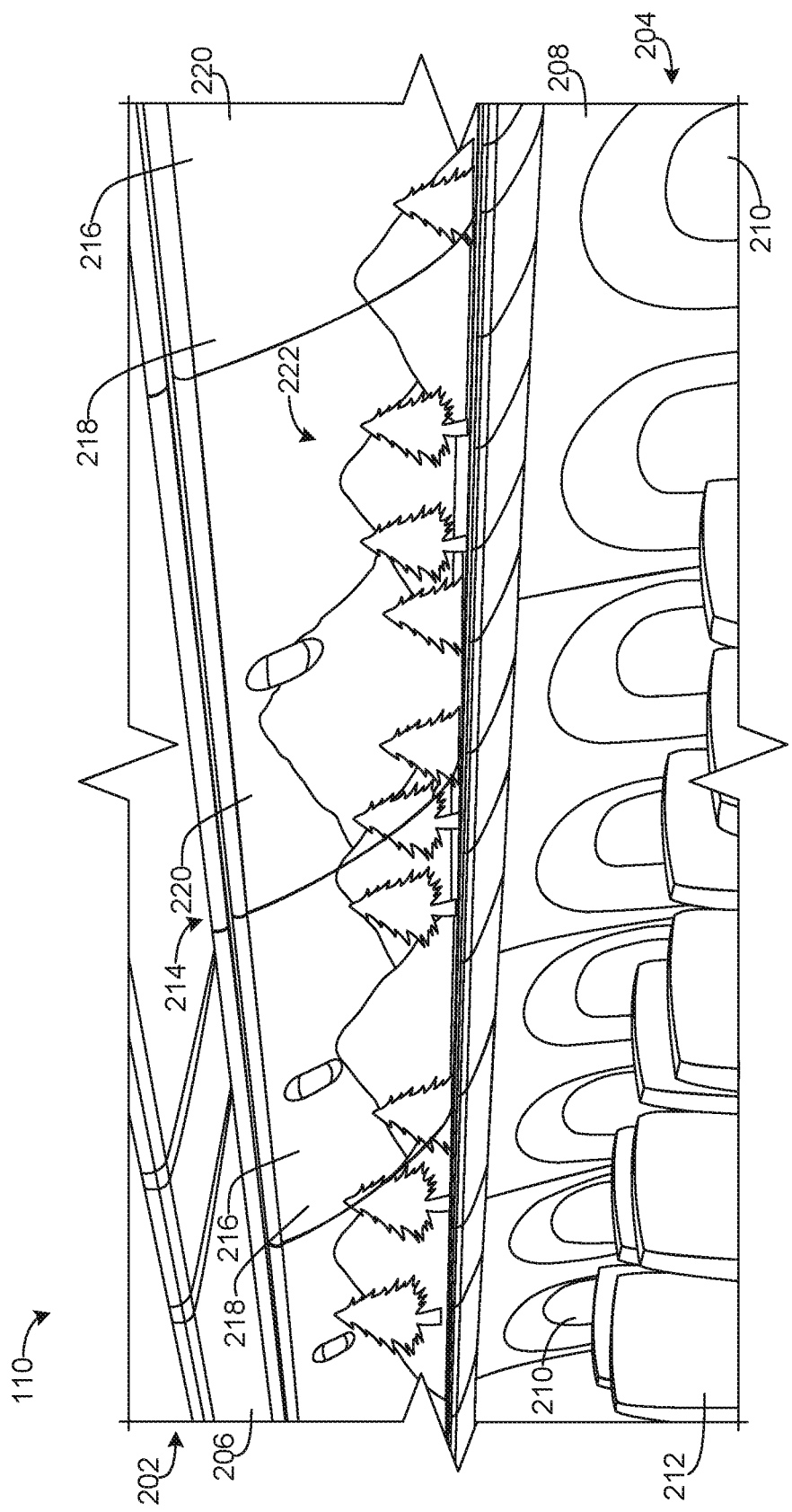
FIG. 2 depicts an example decorative laminate coupled to an interior surface of the aircraft of FIG. 1 in accordance with the teachings herein.

FIG. 2 illustrates a portion of the passenger compartment 110 of the aircraft 100 of FIG. 1. The passenger compartment 110 is defined, in part, by an upper wall 202 and a side wall 204. In the illustrated example, the upper wall 202 is formed by upper wall panels 206, and the side wall 204 is formed by side wall panels 208 in which windows 210 are defined. As illustrated in FIG. 2, the passenger compartment 110 includes seats 212 and overhead bins 214. For example, passengers are to be seated in the seats 212 and carry-on luggage of the passengers and/or other materials are to be stowed in the overhead bins 214 during, before and/or after flight of the aircraft 100.

As illustrated in FIG. 2, the overhead bins 214 include respective doors 216. In the illustrated example, each of the doors 216 of the overhead bins 214 is in a closed position such that luggage and/or other material disposed in the overhead bins 214 are retained by the overhead bins 214. The doors 216 of the overhead bins 214 are formed by respective panels 218. For example, each of the panels 218 is composed of a honeycomb panel. A honeycomb panel is a composite structure in which a core layer is disposed between two opposing reinforcement layers. In some examples, the core layer is composed of lightweight material(s) and has a structure (e.g., the honeycomb pattern) that provides flexural strength (e.g., bending stiffness) to the honeycomb panel. For example, the core layer may be composed of a honeycomb core, a foam core and/or a combination thereof. Thus, the core layer provides flexural strength to the panel without adding a significant amount of weight. Further, in some examples, each of the reinforcement layers includes a fiber layer (e.g., fiberglass, graphite-cloth, synthetic fiber (e.g., Aramid fiber), natural fiber, (e.g., wood, flax, cellulose, jute, hemp, straw, switch grass, kenaf, cotton, coir, bamboo, etc.) pre-impregnated with resin that provides compression strength to the honeycomb panel.

Example decorative laminates 220 in accordance with the teachings of this disclosure are coupled to the panels 218 of the doors 216. For example, each of the decorative laminates 220 is coupled to a respective one of the panels 218. In the illustrated examples, the decorative laminates 220 are positioned to form a decorative pattern or image 222 (e.g., of a sky, mountains, and trees). For example, the decorative image 222 may be displayed in the passenger compartment 110 of the aircraft for aesthetic, informational and/or advertising purposes. While the decorative laminates 220 form the decorative image 222 in the illustrated example, the decorative laminates 220 may form more than one decorative image in other examples. For example, each of the decorative laminates 220 may form a decorative image independently of the other decorative laminates 220. For example, a first decorative laminate may display a first decorative image that is unrelated to and/or identical to a second decorative image of a second decorative laminate, a third decorative image of a third decorative laminate, etc.

Additionally or alternatively, the decorative laminates 220 may be coupled to the upper wall panels 206, the side wall panels 208 and/or any other surface of the passenger compartment 110 of the aircraft 100. For example, the upper wall panels 206 and/or the side wall panels 208 are composed of honeycomb panels and/or any other panel and/or material that enables the decorative laminates 220 to be applied to the upper wall panels 206 and/or the side wall panels 208. Further, the example decorative laminates 220 may be coupled to other surfaces and/or panels of the aircraft 100, other mass transit vehicles and/or any other structures.

Figure 3A:
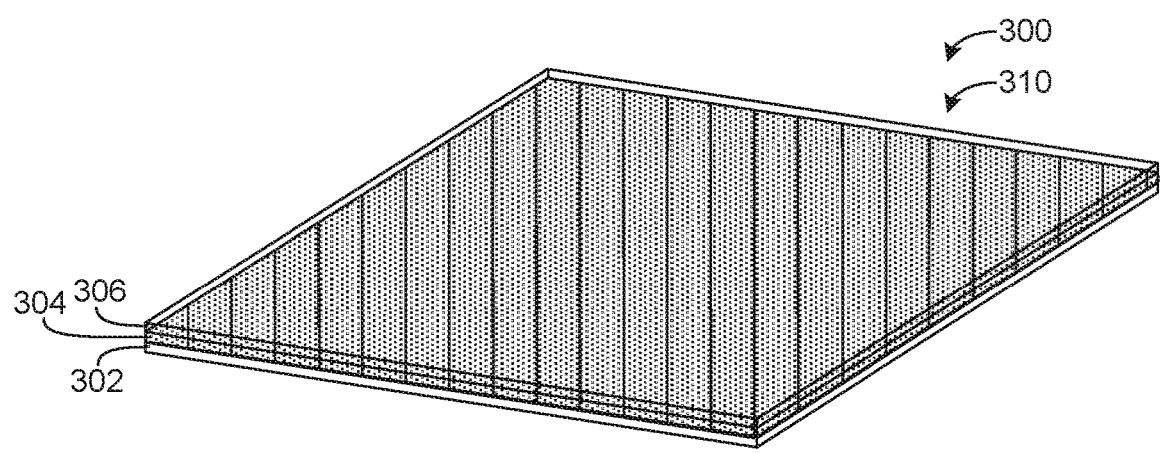
FIG. 3A is a perspective view of an example decorative laminate in accordance with the teachings herein.
Figure 3B:
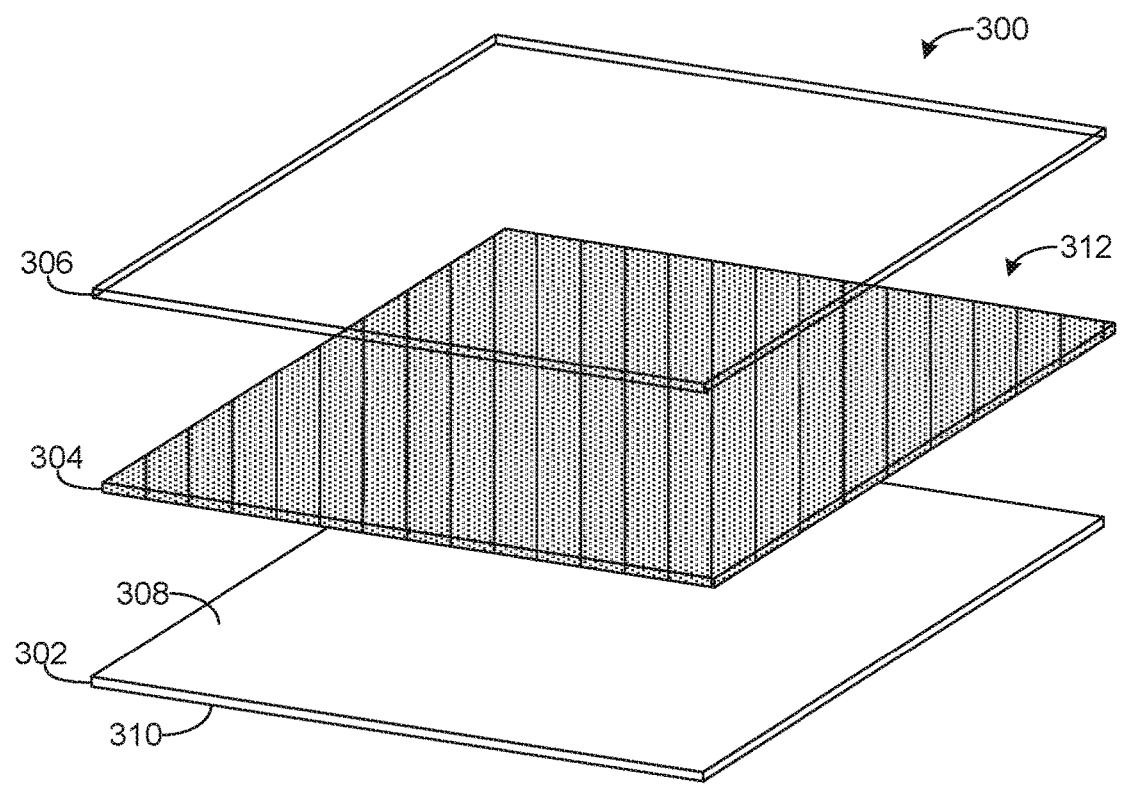
FIG. 3B is an exploded view of the decorative laminate of FIG. 3A.

FIGS. 3A-3B illustrate an example decorative laminate 300 in accordance with the teachings of this disclosure. More specifically, FIG. 3A depicts the decorative laminate 300 when assembled, and FIG. 3B depicts an exploded view of the decorative laminate 300.

As illustrated in FIGS. 3A and 3B, the decorative laminate 300 includes a reinforcing layer 302, a thermoplastic ink layer 304, and a film or cap layer 306. The thermoplastic ink layer 304 is coupled and/or applied to a first surface 308 of the reinforcing layer 302 and the film layer 306 is coupled and/or applied to the thermoplastic ink layer 304 opposite the reinforcing layer 302 such that the thermoplastic ink layer 304 is disposed between the reinforcing layer 302 and the film layer 306.

The reinforcing layer 302 of the decorative laminate 300 provides a rigidity and/or strength to the decorative laminate 300, for example, to enable the decorative laminate 300 to be securely coupled, fixed and/or adhered to a surface of a structure (e.g., one of the panels 218 of FIG. 2). For example, the reinforcing layer 302 is composed of a woven or unwoven fabric such as polyester, fiberglass, Nomex®, Kevlar®, carbon fiber, and/or any other durable fabric. In other examples, the reinforcing layer 302 is composed of a rigid film. To enable the reinforcing layer 302 to withstand a manufacturing process of the decorative laminate 300 without deforming, the material of the reinforcing layer is resistant to contracting and/or expanding at substantially high temperatures (e.g., about between 150 and 320 degrees Fahrenheit). Further, in some examples, an adhesive layer is applied to a second surface 310 of the reinforcing layer 302 opposite the first surface 308 to enable the decorative laminate 300 to be coupled and/or fixed to a surface of a structure (e.g., one of the panels 218 of FIG. 2).

The thermoplastic ink layer 304 of the example decorative laminate 300 includes a layer of thermoplastic ink that forms a decorative pattern or image 312 of the decorative laminate 300 and bonds to the reinforcing layer 302 to form the decorative laminate 300. For example, the thermoplastic ink layer 304 includes color(s) and/or pattern(s) that form the decorative image 312. In the illustrated example, the thermoplastic ink layer 304 is a solid layer of opaque ink covering the reinforcing layer 302 such that the decorative image 312 is a solid, opaque pattern. Further, the thermoplastic ink of the thermoplastic ink layer 304 is, for example, a plastisol ink (i.e., a non-water-based ink) in which particles of polyvinyl chloride (PVC) are suspended in a liquid plasticizer that cures upon application of heat to the decorative laminate 300 (e.g., when the ink is heated to a temperature of at least about 150 degrees Fahrenheit). In examples in which the reinforcing layer 302 is composed of fabric, the plastisol ink bonds to fibers of the fabric to securely bond the reinforcing layer 302 and the thermoplastic ink layer 304 together. The thermoplastic ink layer 304 may be composed of fire-resistant material that, for example, enables the decorative laminate 300 to satisfy government agency regulations (e.g., of the Federal Aviation Agency) associated with installing laminates on aircraft.

The example film layer 306 is a clear layer that is coupled to the thermoplastic ink layer 304 opposite the first surface 308 of the reinforcing layer 302 to prevent the thermoplastic ink layer 304 from being damaged and/or to preserve the decorative image 312 formed by the thermoplastic ink layer 304. Further, the film layer 306 is clear, transparent and/or translucent to enable the decorative image 312 formed by the thermoplastic ink layer 304 to be displayed when the decorative laminate 300 is formed. In some examples, the film layer 306 includes a clear film (e.g., composed of polyvinyl fluoride (e.g., Tedlar®)) and an adhesive layer that is to couple to the thermoplastic ink layer 304. In other examples, the film layer 306 is a clear layer of solidified thermoplastic ink.

To form the example decorative laminate 300, the thermoplastic ink layer 304 is applied to the first surface 308 of the reinforcing layer 302 and the film layer 306 is applied to the thermoplastic ink layer 304 opposite the reinforcing layer 302 such that the thermoplastic ink layer 304 is disposed between the reinforcing layer 302 and the film layer 306. For example, the thermoplastic ink layer 304 is applied to the reinforcing layer 302 as a paste via a silkscreen printing process (e.g., utilizing a rotary silkscreen and/or a flatbed silkscreen). Further, the thermoplastic ink layer 304 is solidified (e.g., cured) by applying heat and/or otherwise treating the thermoplastic ink layer 304. For example, the thermoplastic ink layer 304 is heated to a temperature of at least about 150 degrees Fahrenheit (e.g., via an oven) to partially solidify the thermoplastic ink layer 304 and/or to a temperature of at least about 300 degrees Fahrenheit to fully solidify the thermoplastic ink layer 304. Subsequently, the film layer 306 is applied and/or coupled to the thermoplastic ink layer 304 opposite the reinforcing layer 302. In some examples, another layer of thermoplastic ink is applied to the thermoplastic ink layer 304 via a silkscreen printing process and/or a layer of non-thermoplastic ink (e.g., water-based ink) is applied to the thermoplastic ink layer 304 via a silkscreen printing process and/or a digital printing process. To form the decorative laminate 300, the decorative laminate 300 is heated to a temperature of at least about 300 degrees Fahrenheit to bond the thermoplastic ink layer 304 and the reinforcing layer 302 of the decorative laminate 300 together. In examples in which the film layer 306 is a clear layer of thermoplastic ink, the decorative laminate 300 is heated to bond the thermoplastic ink layer 304 and the film layer 306 together.

Thus, the thermoplastic ink layer 304 that forms the decorative image 312 of the decorative laminate 300 also bonds the thermoplastic ink layer 304 and the reinforcing layer 302 together, thereby reducing a number of layers of the decorative laminate 300. For example, the reduced number of layers of the decorative laminate 300 reduces a weight of the decorative laminate 300. Further, the reduced number of layers reduces complexity in manufacturing the decorative laminate 300 and/or waste resulting from the manufacturing process, thereby reducing manufacturing time and/or costs associated with producing the decorative laminate 300.

In some examples, the decorative laminate 300 is formed on a roll of the reinforcing layer 302 to further reduce manufacturing time, manufacturing costs and/or waste. For example, to form the decorative laminate 300, the roll of the reinforcing layer 302 initially is unwound. While the roll is unwound, the thermoplastic ink layer 304 is applied to and solidified (e.g., partially or fully) on the first surface of the reinforcing layer 302. The roll of the reinforcing layer 302 is then rewound. Subsequently, the roll again is unwound, the film layer 306 is coupled to the thermoplastic ink layer 304, and heat is applied to the decorative laminate 300 to bond the thermoplastic ink layer 304 to the reinforcing layer 302 and/or the film layer 306 of the decorative laminate 300. After the decorative laminate 300 is formed, the roll again may be rewound to enable an uncut roll of the decorative laminate 300 to be stored. By forming the decorative laminate 300 onto the roll without precutting segments of the reinforcing layer 302, the thermoplastic ink layer 304 and/or the film layer 306, manufacturing time, costs and/or waste associated with forming the decorative laminate 300 is reduced.

Figure 4:
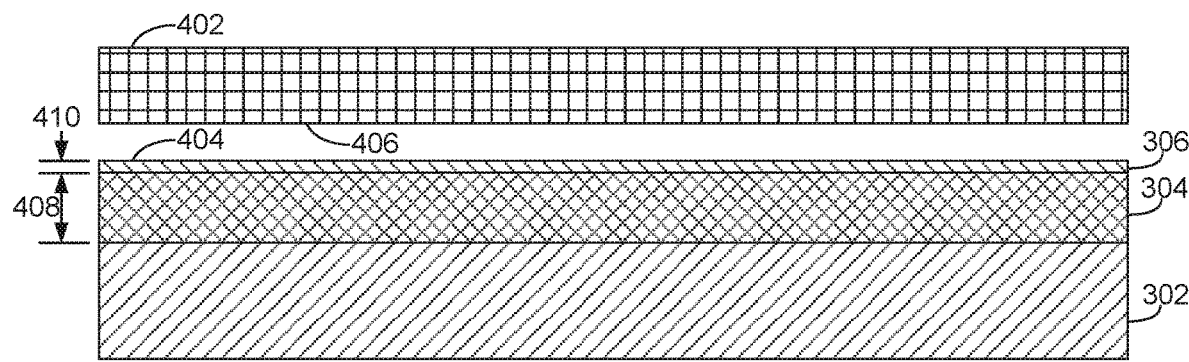
FIG. 4 is a partial cross-sectional view of the decorative laminate of FIGS. 3A-3B without a textured surface.

FIG. 4 is a partial cross-sectional view of the example decorative laminate 300 and an example texture medium or hot press 402 utilized to form an example outer surface 404 of the decorative laminate 300 having a texture that is substantially flat. The hot press 402 is applied to the decorative laminate 300 to bond the thermoplastic ink layer 304 to the reinforcing layer 302 and/or the film layer 306 of the decorative laminate 300. That is, the hot press 402 applies the heat and/or pressure to bond the thermoplastic ink layer 304 to the reinforcing layer 302 and/or the film layer 306. For example, the hot press 402 applies a temperature of at least about 300 degrees (e.g., 320 degrees) to the decorative laminate 300 to bond the thermoplastic ink layer 304 to the reinforcing layer 302 and/or the film layer 306 and to fully solidify the thermoplastic ink layer 304. As illustrated in FIG. 4, the hot press 402 includes a surface 406 that engages the outer surface 404 of the decorative laminate 300 to enable the hot press 402 to apply heat and/or pressure to the decorative laminate 300. In the illustrated example, the surface 406 of the hot press 402 is flat so that the outer surface 404 of the decorative laminate 300 is flat. Further, as illustrated in FIG. 4, the thermoplastic ink layer 304 of the decorative laminate 300 has a thickness 408 (e.g., a first thickness) that is greater than a thickness 410 (e.g., a second thickness) of the film layer 306.

Figure 5:
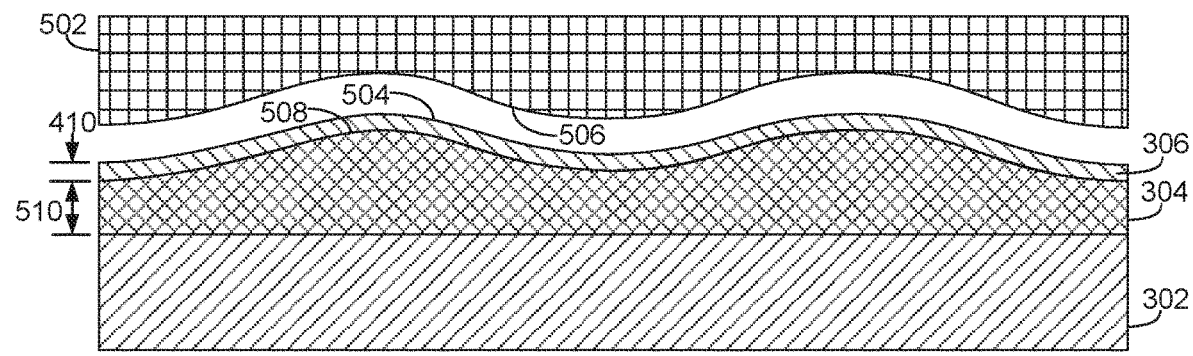
FIG. 5 is another partial cross-sectional view of the decorative laminate of FIGS. 3A-3B having a textured surface.

FIG. 5 is a partial cross-sectional view of the example decorative laminate 300 and another example texture medium or hot press 502 utilized to form an example outer surface 504 of the decorative laminate 300 that is embossed or textured. The texture or embossing of the outer surface 504 and the color and/or patterns of the thermoplastic ink layer 304 form the decorative image 312 (FIGS. 3A-3B) of the decorative laminate 300. For example, the decorative laminates 220 of FIG. 2 may be embossed to further illustrate the trees and the mountains of the decorative image 222 of FIG. 2.

Returning to FIG. 5, the hot press 502 has a textured surface 506 that is to engage the outer surface 504 of the decorative laminate 300. To form the decorative laminate 300, the textured surface 506 of the hot press 502 engages the outer surface 504 of the decorative laminate 300 and the hot press 502 applies heat and/or pressure to bond the thermoplastic ink layer 304 to the reinforcing layer 302 and/or the film layer 306. Because the thermoplastic ink layer 304 is malleable prior to being solidified by the hot press 502, the thermoplastic ink layer 304 becomes textured or embossed as the textured surface 506 of the hot press 502 applies heat and/or pressure to the decorative laminate 300. As illustrated in FIG. 5, the textured surface 506 of the hot press 502 produces a textured surface 508 of the thermoplastic ink layer 304. For example, prior to the hot press 502 being applied to the decorative laminate 300, the thermoplastic ink layer 304 has a uniform thickness substantially similar to the thickness 408 of FIG. 4 that enables the thermoplastic ink layer 304 to become textured. After the hot press 502 having the textured surface 506 engages the decorative laminate 300, the thermoplastic ink layer 304 has a non-uniform thickness 510 that is formed by and compliments the textured surface 506 of the hot press 502. Because the thickness 410 of the film layer 306 remains substantially uniform, the textured surface 508 of the thermoplastic ink layer 304 causes the outer surface 504 of the decorative laminate 300 to be textured.

Figure 6A:
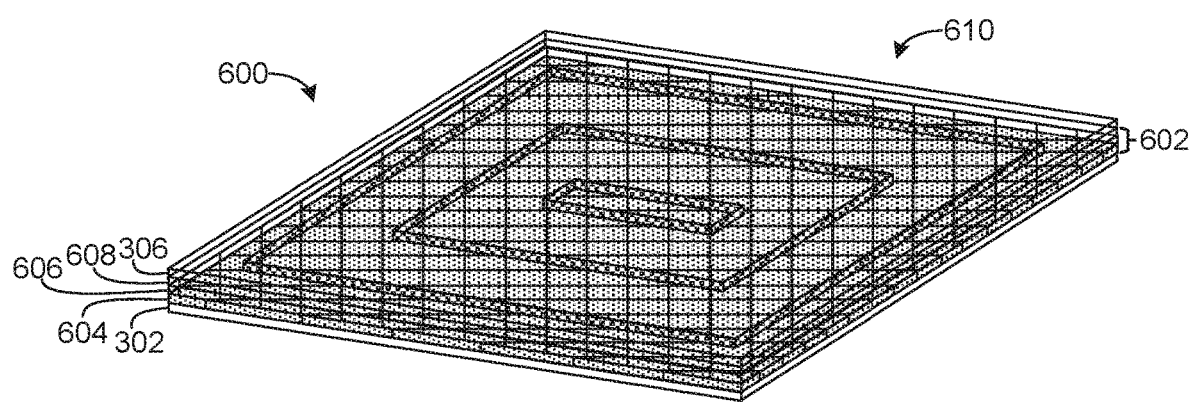
FIG. 6A is a perspective view of another example decorative laminate in accordance with the teachings herein.
Figure 6B:
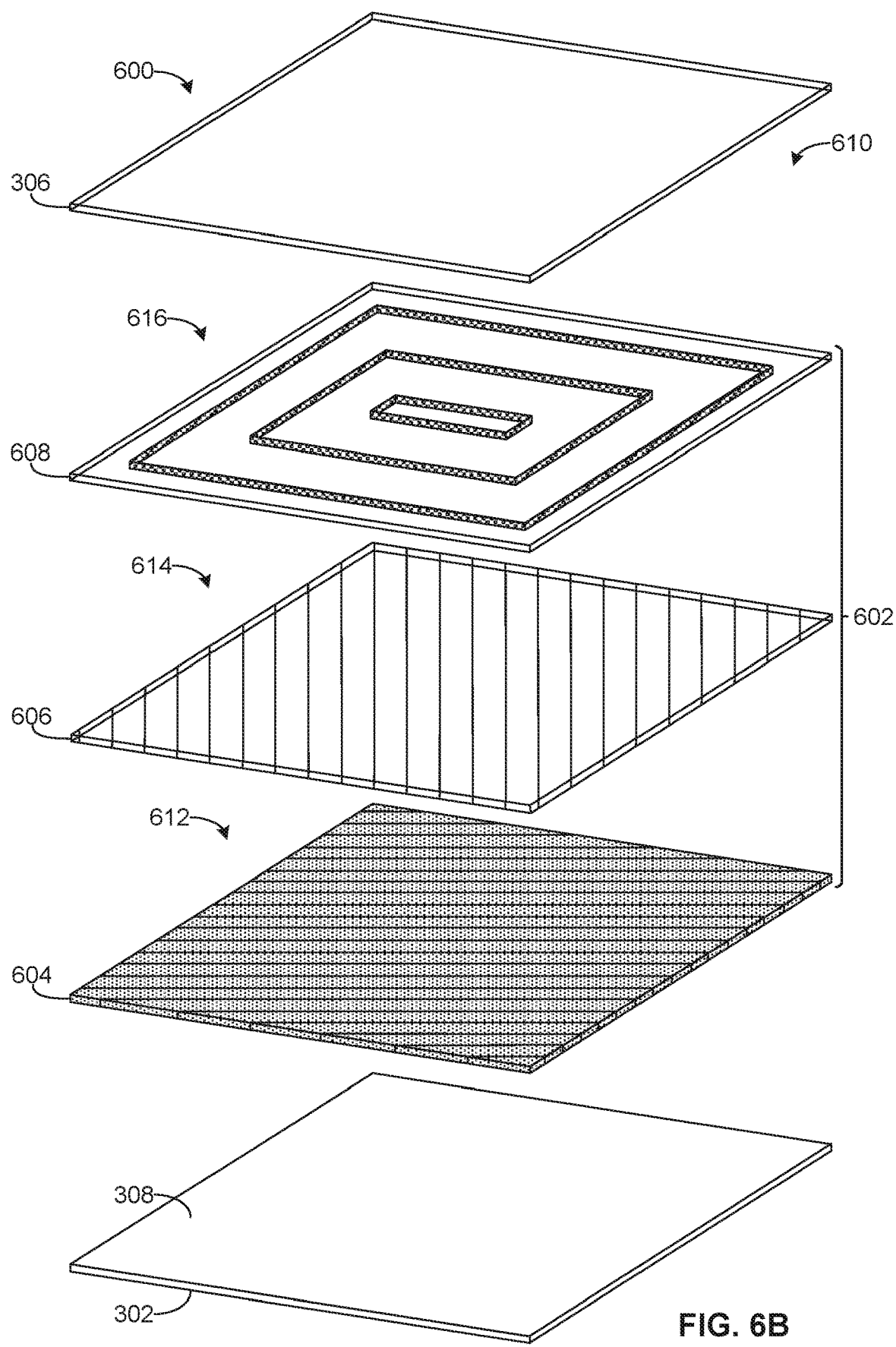
FIG. 6B is an exploded view of the decorative laminate of FIG. 7.

FIGS. 6A and 6B illustrate another example decorative laminate 600 in accordance with the teachings disclosed herein. More specifically, FIG. 6A depicts the decorative laminate 600 when assembled, and FIG. 6B depicts an exploded view of the decorative laminate 600.

As illustrated in FIGS. 6A and 6B, the decorative laminate 600 includes the reinforcing layer 302, thermoplastic ink 602, and the film layer 306. In the illustrated example, the thermoplastic ink 602 includes a first thermoplastic ink layer 604, a second thermoplastic ink layer 606, and a third thermoplastic ink layer 608. The reinforcing layer 302 and the film layer 306 of FIGS. 6A and 6B are substantially similar or identical to those components having the same reference numbers in FIGS. 3A-5. Further, the first thermoplastic ink layer 604, the second thermoplastic ink layer 606, and the third thermoplastic ink layer 608 of FIGS. 6A and 6B are substantially similar or identical to the thermoplastic ink layer 304 of FIGS. 3A-5. Because the reinforcing layer 302, the thermoplastic ink layer 304, and the film layer 306 are described in detail in connection with FIGS. 3A-5, some characteristics of the reinforcing layer 302, the film layer 306, the first thermoplastic ink layer 604, the second thermoplastic ink layer 606, and the third thermoplastic ink layer 608 are not described in further detail below.

As illustrated in FIGS. 6A and 6B, the first thermoplastic ink layer 604, the second thermoplastic ink layer 606, and the third thermoplastic ink layer 608 form a decorative pattern or image 610 of the decorative laminate 600. For example, each of the thermoplastic ink layers 604, 606, 608 includes respective color(s) and/or pattern(s). The first thermoplastic ink layer 604 includes a first pattern or image 612, the second thermoplastic ink layer 606 includes a second pattern or image 614, and the third thermoplastic ink layer 608 includes a third pattern or image 616 that form the decorative image 610. For example, the first thermoplastic ink layer 604 is a solid layer of opaque ink that is applied to the reinforcing layer 302 to cover the reinforcing layer 302. Further, the second thermoplastic ink layer 606 includes translucent and/or opaque ink that covers and/or partially covers the first thermoplastic ink layer 604, and the third thermoplastic ink layer 608 includes translucent and/or opaque ink that covers and/or partially covers the first thermoplastic ink layer 604 and/or the second thermoplastic ink layer 606. For example, referring to the decorative laminates 220 of FIG. 2, the first thermoplastic ink layer 604 forms the sky of the decorative image 222, the second thermoplastic ink layer 606 forms the mountains, and the third thermoplastic ink layer 608 forms the trees.

To form the example decorative laminate 600, the first thermoplastic ink layer 604 is applied to the reinforcing layer 302 and solidified upon being heated to a predetermined temperature. Subsequently, the second thermoplastic ink layer 606 is applied to the first thermoplastic ink layer 604 and solidified upon being heated to a predetermined temperature. Further, the third thermoplastic ink layer 608 is applied to the second thermoplastic ink layer 606, the first thermoplastic ink layer 604 and/or the reinforcing layer 302 and solidified upon being heated to a predetermined temperature. In some examples, one or more of the thermoplastic ink layers 604, 606, 608 may be fully solidified (e.g., fully cured) by heating the corresponding one or more of the thermoplastic ink layers 604, 606, 608 to a temperature of at least about 300 degrees Fahrenheit (e.g., 320 Fahrenheit) via an oven and/or other heating device. Additionally or alternatively, one or more of the thermoplastic ink layers 604, 606, 608 are partially solidified by heating the corresponding one or more of the thermoplastic ink layers 604, 606, 608 to a temperature of at least about 150 degrees Fahrenheit (e.g., 160 degrees Fahrenheit) via an oven and/or other heating device. In such examples, those of the thermoplastic ink layers 604, 606, 608 that are partially solidified are subsequently fully solidified when the hot press (e.g., the hot press 402 of FIG. 4, the hot press 502 of FIG. 5) applies heat to the decorative laminate 600 to bond the layers 302, 604, 606, 608 of the decorative laminate 600 together. By initially partially solidifying the thermoplastic ink layers 604, 606, 608 via an oven and/or other heating device, manufacturing costs and/or time associated with production of the decorative laminate 600 may be reduced.

In some examples, the decorative laminate 600 is formed on a roll of the reinforcing layer 302 to further reduce manufacturing time, manufacturing costs and/or waste. For example, to add the first thermoplastic ink layer 604 to the decorative laminate 600, the roll is unwound, the first thermoplastic ink layer 604 is applied to the unwound reinforcing layer 302, the first thermoplastic ink layer 604 is solidified (e.g., partially or fully), and the roll is rewound. Further, the second and third thermoplastic ink layers 606, 608 are added to the decorative laminate 600 in a manner similar to that for the first thermoplastic ink layer 604. After the thermoplastic ink layers 604, 606, 608 are applied, the film layer 306 is coupled to the thermoplastic ink 602 and heat is applied to the decorative laminate 600 to bond the layers 302, 604, 606, 608 of the decorative laminate 600 together.

In the illustrated example, the thermoplastic ink 602 includes three layers of thermoplastic ink (e.g., the first, second, and third thermoplastic ink layers 604, 606, 608). In other examples, the thermoplastic ink 602 may include more (e.g., 4, 5, 6, etc.) or fewer (e.g., 1, 2) layers of thermoplastic ink. For example, the thermoplastic ink 602 may have two layers including a first thermoplastic ink layer that is applied to the reinforcing layer 302 and a second thermoplastic ink layer that is applied to the first thermoplastic ink layer and/or the reinforcing layer and to which the film layer 306 is applied.

Figure 7:
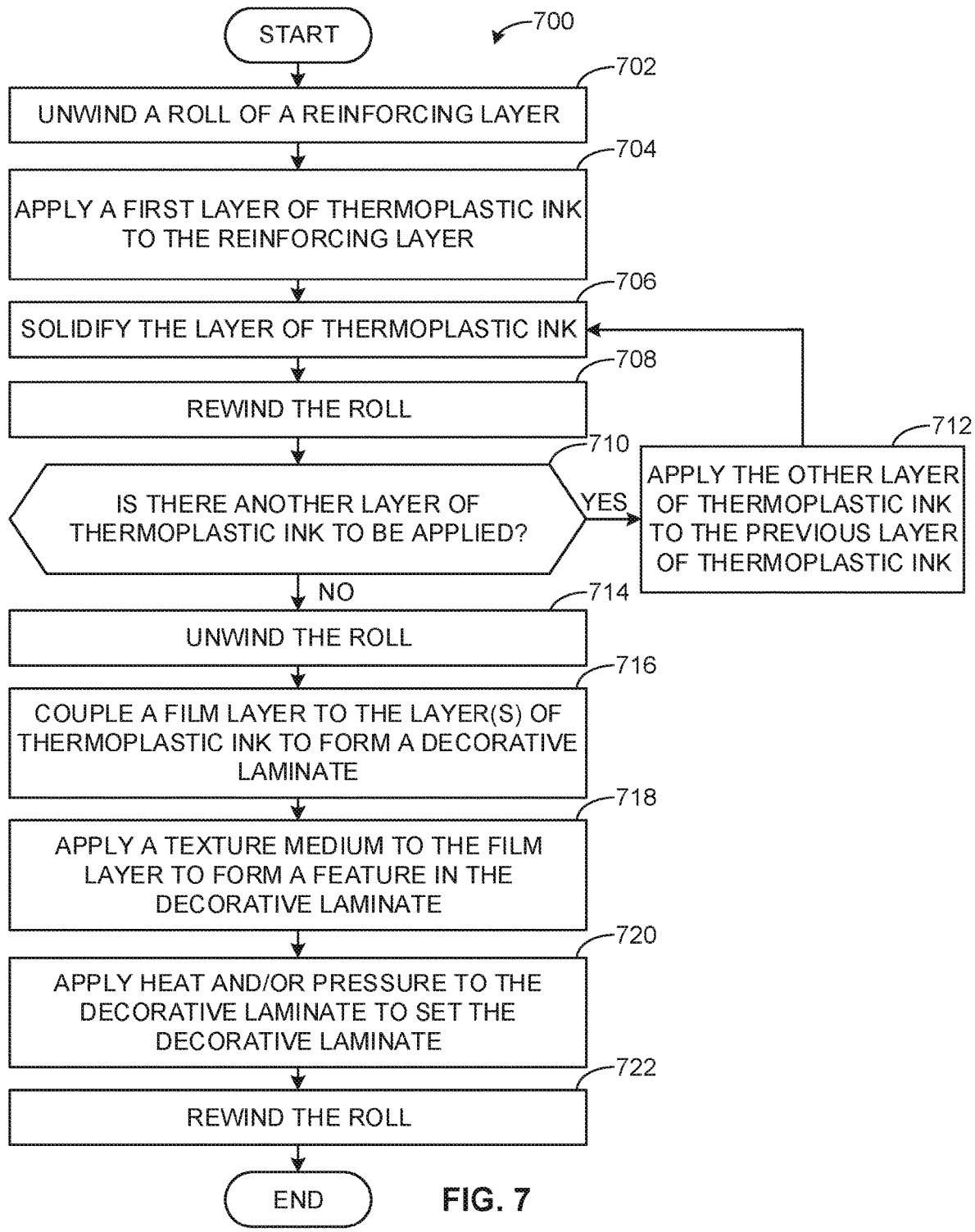
FIG. 7 is a flowchart representative of an example method to assemble the example decorative laminate of FIG. 2, the example decorative laminate of FIGS. 3A-5 and/or the example decorative laminate of FIGS. 6A-6B in accordance with the teachings herein.

FIG. 7 is a flowchart representative of an example method 700 to assemble an example decorative laminate in accordance with the teachings herein. Although the example method 700 is described with reference to the flowchart illustrated in FIG. 7, many other methods for assembling the decorative laminate may alternatively be used. For example, the order of execution of the blocks may be changed, and/or some of the blocks described changed, eliminated, and/or combined.

The method 700 for assembling a decorative laminate is discussed in connection with the decorative laminates 220 of FIG. 2, the decorative laminate 300 of FIGS. 3A-5 and/or the decorative laminate 600 of FIGS. 6A-6B. Further, because the method 700 may refer to the decorative laminates 220 of FIG. 2, the decorative laminate 300 of FIGS. 3A-5 and/or the decorative laminate 600 of FIGS. 6A-6B, components identified in FIGS. 2-6B having functions substantially similar or identical to the functions of components described below will not be described in detail again. Instead, the same reference numbers will be used for like structures.

To form a decorative laminate (e.g., the decorative laminates 220 of FIG. 2, the decorative laminate 300 of FIGS. 3A-5, the decorative laminate 600 of FIGS. 6A-6B), the example method 700 disclosed herein starts at block 702 by unwinding a roll of a reinforcing layer (e.g., a reinforcing layer 302 of FIGS. 3A-6B). At block 704, a first layer of thermoplastic ink (e.g., the thermoplastic ink layer 304 of FIGS. 3A-5, the first thermoplastic ink layer 604 of FIGS. 6A-6B) is applied to the reinforcing layer. For example, the first layer of thermoplastic ink is applied to the reinforcing layer as a paste. In some examples, the thermoplastic ink is applied via a silkscreen printing process utilizing, for example, a rotary silkscreen and/or a flatbed silkscreen. At block 706, the applied layer of thermoplastic ink is solidified (e.g., cured). In some examples, the layer of thermoplastic ink is fully solidified by heating the thermoplastic ink to a temperature of at least about 300 degrees Fahrenheit (e.g., to 320 degrees Fahrenheit). In other examples, the layer of thermoplastic ink is partially solidified (e.g., partially cured) by heating the thermoplastic ink for example, via an oven, to a temperature of about 150 degrees Fahrenheit (e.g., to 160 degrees Fahrenheit). At block 708, the roll of the reinforcing layer is rewound.

The method 700 includes determining whether there is another layer of thermoplastic ink (e.g., the second thermoplastic ink layer 606 of FIGS. 6A-6B, the third thermoplastic ink layer 608 of FIGS. 6A-6B) to be applied to form the decorative laminate (block 710). If there is another layer of thermoplastic ink to be applied, the other layer of thermoplastic ink is applied to the previously-applied layer(s) of thermoplastic ink and/or the reinforcing layer (block 712). Further, blocks 706, 708 are repeated for the other layer of thermoplastic ink. Blocks 706, 708, 710, 712 are repeated until no other layers of thermoplastic ink are identified. Additionally or alternatively, a layer of non-thermoplastic ink (e.g., water-based ink) may be applied to the layer of thermoplastic ink solidified at block 706 via, for example, a silkscreen printing process and/or a digital printing process.

At block 714, the roll of the reinforcing layer unto which the layer(s) of thermoplastic ink is applied is unwound. At block 716, a film layer (e.g., the film layer 306 of FIGS. 3A-6B) is coupled to the layer(s) of thermoplastic ink to form the decorative laminate. In some examples, the film layer includes a clear, transparent and/or translucent film and an adhesive layer coupled to the film that is applied to the layer(s) of thermoplastic ink. In other examples, the film layer is a clear layer of thermoplastic ink that is solidified upon being applied to the layer(s) of thermoplastic ink.

At block 718, a texture medium (e.g., the hot press 502 of FIG. 5) is applied to the decorative laminate. For example, a textured surface (e.g., the textured surface 506 of FIG. 5) of a texture medium (e.g., the hot press 502 of FIG. 5) engages an outer surface (e.g., the outer surface 504 of FIG. 5) of the decorative laminate to form a texture (e.g., an embossment) in the decorative laminate.

At block 720, heat and/or pressure is applied to the decorative laminate to set the decorative laminate. For example, the heat and/or pressure are applied to cure the layer(s) of thermoplastic ink to bond the layer(s) of the decorative laminate together. In some examples, the decorative laminate is heated to a temperature of at least about 300 degrees Fahrenheit to set the decorative laminate. In examples in which the texture is to be formed in the decorative laminate, heat may be applied to the decorative laminate via the texture medium having the textured surface. In examples in which the texture is not to be formed in the decorative laminate, heat may be applied to the decorative laminate via a texture medium (e.g., the hot press 402 of FIG. 402) having a substantially flat surface (e.g., the surface 406 of FIG. 4) that engages the decorative laminate. At block 722, the roll of the decorative laminate is rewound to enable the uncut roll of decorative laminate to be stored.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A method comprising:
applying thermoplastic ink to a reinforcing layer, the reinforcing layer to provide a rigidity to a decorative laminate, the thermoplastic ink to form a decorative pattern of the decorative laminate;
applying heat, via an oven, to partially solidify the thermoplastic ink applied to the reinforcing layer;
coupling a film layer to the thermoplastic ink to form the decorative laminate, the film layer to preserve the decorative pattern of the decorative laminate, the thermoplastic ink to remain partially solidified during coupling of the film layer to the thermoplastic ink;
contacting a heated press to the film layer;
embossing, via the heated press, the decorative laminate to define an embossed shape of the decorative laminate, wherein the decorative laminate is to be heated to a temperature of at least about 300 degrees Fahrenheit by the heated press during the embossing to set the embossed shape of the decorative laminate; and
fully solidifying, via the heated press, the partially solidified thermoplastic ink during the embossing of the decorate laminate.

2. The method of claim 1, wherein applying the thermoplastic ink to the reinforcing layer includes applying the thermoplastic ink to a roll of the reinforcing layer that is unwound.

3. The method of claim 2, wherein the roll is unwound prior applying the thermoplastic ink to the reinforcing layer and is rewound upon forming the decorative laminate.

4. The method of claim 1, wherein applying the thermoplastic ink to the reinforcing layer includes applying a first thermoplastic ink layer to the reinforcing layer and applying a second thermoplastic ink layer to the first thermoplastic ink layer.

5. The method of claim 4, further including:
winding the reinforcing layer and the first thermoplastic ink layer into a roll upon partially solidifying the first thermoplastic ink layer on the reinforcing layer; and
unwinding the roll of the reinforcing layer and the first thermoplastic ink layer to enable the second thermoplastic ink layer to be applied to the first thermoplastic ink layer.

6. The method of claim 1, wherein coupling the film layer includes applying a clear thermoplastic ink layer to the thermoplastic ink applied to the reinforcing layer.

7. The method of claim 1, wherein the reinforcing layer includes a fiber layer.

8. The method of claim 7, wherein the fiber layer includes a synthetic fiber.

9. The method of claim 7, wherein the fiber layer includes a natural fiber.

10. The method of claim 1, wherein the heated press is to cause the thermoplastic ink to have a non-uniform thickness.

11. A method of forming a decorative laminate, the method comprising:
providing a reinforcing layer having a rigid film that defines a first surface and a second surface opposite the first surface;
forming a decorative pattern of the decorative laminate by applying a thermoplastic ink layer to the first surface of the reinforcing layer;

applying heat, via an oven, to partially solidify the thermoplastic ink layer applied to the first surface;

coupling a film layer to the thermoplastic ink layer, the film layer to protect the decorative pattern formed by the thermoplastic ink layer, the thermoplastic ink layer to remain partially solidified during coupling of the film layer to the thermoplastic ink layer;

contacting a heated press to the film layer;

embossing, via the heated press, the decorative laminate to define an embossed shape of the decorative laminate, wherein the decorative laminate is to be heated by the heated press to a temperature of at least about 300 degrees Fahrenheit to set the embossed shape of the decorative laminate; and fully solidifying, via the heated press, the partially solidified thermoplastic ink layer during the embossing of the decorate laminate.

12. The method of claim 11, wherein the providing of the reinforcing layer includes forming the reinforcing layer from woven or unwoven fabric including at least one of polyester, fiberglass, or carbon fiber.

13. The method of claim 12, wherein the applying the thermoplastic ink layer includes applying a layer of thermoplastic ink to the first surface of the reinforcing layer.

14. The method of claim 11, wherein the applying the thermoplastic ink layer includes applying a first thermoplastic ink layer on the reinforcement layer in a first pattern and applying a second thermoplastic ink layer on the first thermoplastic ink layer in a second pattern, the first pattern and the second pattern forming the decorative pattern of the decorative laminate.

15. The method of claim 11, further including bonding the thermoplastic ink layer to the reinforcement layer.

16. The method of claim 11, wherein coupling the film layer includes applying a clear thermoplastic ink layer to the thermoplastic ink applied to the reinforcing layer.

17. A method of forming a decorative laminate, the method comprising:

unwinding a roll of a reinforcing layer;

applying a thermoplastic ink layer to an unwound portion of the reinforcing layer to form a decorative image;

applying heat, via an oven, to partially solidify the thermoplastic ink layer;

coupling a film layer to the thermoplastic ink layer, the thermoplastic ink layer to remain partially solidified during coupling of the film layer to the thermoplastic ink layer;

contacting a heated press to the film layer;

embossing, via the heated press, the decorative laminate to define an embossed shape of the decorative laminate while heating the decorative laminate, via the heated press, to a temperature of at least about 300 degrees Fahrenheit to set the embossed shape of the decorative laminate; and fully solidifying, via the heated press, the partially solidified thermoplastic ink layer during the embossing of the decorate laminate.

18. The method of claim 17, wherein the applying of the thermoplastic ink layer includes applying a thermoplastic ink to the reinforcing layer via a silkscreen printing process.

19. The method of claim 17, wherein applying the thermoplastic ink layer includes applying a first thermoplastic ink layer to the reinforcing layer, and applying a second thermoplastic ink layer to the first thermoplastic ink layer.

20. The method of claim 17, further including applying a non-thermoplastic ink layer to the thermoplastic ink layer.

* * * * *